(12) United States Patent
Nozu et al.

(10) Patent No.: US 7,426,103 B2
(45) Date of Patent: Sep. 16, 2008

(54) ELECTRIC DOUBLE LAYER CAPACITOR, CONTROL METHOD THEREOF, AND ENERGY STORAGE SYSTEM USING THE SAME

(75) Inventors: Ryutaro Nozu, Chiba (JP); Mami Nakamura, Chiba (JP)

(73) Assignee: Nisshinbo Industries, Inc., Tokyo (JP)

( * ) Notice: Subject to any disclaimer, the term of this patent is extended or adjusted under 35 U.S.C. 154(b) by 134 days.

(21) Appl. No.: 11/419,086

(22) Filed: May 18, 2006

(65) Prior Publication Data

US 2006/0262484 A1  Nov. 23, 2006

(30) Foreign Application Priority Data

May 20, 2005  (JP)  ............................. 2005-148250

(51) Int. Cl.
*H01G 9/00* (2006.01)
(52) U.S. Cl. ..................... 361/502; 361/503; 361/504; 361/508; 361/510; 361/512
(58) Field of Classification Search ................. 361/502, 361/503–504, 508–512, 516–519, 523–528, 361/302–305
See application file for complete search history.

(56) References Cited

U.S. PATENT DOCUMENTS

| | | | | |
|---|---|---|---|---|
| 5,691,877 A | * | 11/1997 | Hanamura et al. | .......... 361/313 |
| 5,917,309 A | * | 6/1999 | Shimizu | ..................... 320/166 |
| 5,930,108 A | | 7/1999 | Kurzweil et al. | |
| 5,955,215 A | | 9/1999 | Kurzweil et al. | |
| 6,219,221 B1 | * | 4/2001 | Kibi et al. | ................... 361/502 |
| 6,327,137 B1 | * | 12/2001 | Yamamoto et al. | .......... 361/517 |
| 6,751,833 B2 | * | 6/2004 | Saito et al. | ................. 29/25.42 |
| 6,775,126 B2 | * | 8/2004 | Fujii et al. | ................... 361/523 |

FOREIGN PATENT DOCUMENTS

| | | |
|---|---|---|
| EP | 1 335 395 | 8/2003 |
| EP | 1 471 545 | 10/2004 |
| GB | 2 056 774 | 3/1981 |
| JP | 2002-359155 | 12/2002 |

* cited by examiner

*Primary Examiner*—Nguyen T Ha
(74) *Attorney, Agent, or Firm*—Oblon, Spivak, McClelland, Maier & Neustadt, P.C.

(57) ABSTRACT

An electric double layer capacitor is configured as follows. A changeover switch is connected to a positive electrode of the electric double layer capacitor, a power supply or electric load is connected to a terminal a of the changeover switch, and an auxiliary electrode is connected to a terminal b thereof through a resistor. The changeover switch is being switched to the terminal a, and discharge and charge of the electric double layer capacitor are repeated. When a discharge capacity becomes equal to or less than a lower limit threshold or an internal resistance becomes equal to or more than an upper limit threshold, the changeover switch is switched to the terminal b from the terminal a to make a channel between the positive electrode and the auxiliary electrode be a closed circuit through the resistor, and resistance discharge is conducted from the positive electrode.

14 Claims, 5 Drawing Sheets

ELECTRIC DOUBLE LAYER CAPACITOR, CONTROL METHOD THEREOF, AND ENERGY STORAGE SYSTEM USING THE SAME

BACKGROUND OF THE INVENTION

This invention relates to an electric double layer capacitor used as a power supply for an automobile and a power supply for storing electric power, a control method thereof, an energy storage system using it, and improvement of a secondary cell.

The electric double layer capacitor is an electrochemical device consisting of a positive electrode, a negative electrode, a solution containing a cation and an anion (electrolyte). It can store and discharge electric charges by utilizing a very thin electrical insulating layer formed on interfaces between the positive and negative electrodes and the electrolyte, respectively, namely the electric double layers, as a dielectric, and adsorbing and desorbing the anion on the positive electrode and the cation on the negative electrode, respectively.

It is a widely held view that such an electric double layer capacitor does not entail chemical reactions and therefore has a longer life than chemical secondary cells because theoretically electric charges are stored and discharged by the positive electrode and the negative electrode adsorbing and desorbing the anion and the cation, respectively.

For example, the electric double layer capacitor that has a large energy and a long life is also disclosed by JP 2002-359155 A.

However, in the above-mentioned conventional technology, a very small amount of impurities existing in the electric double layer capacitor causes chemical reactions during discharge and charge, which causes a balance of electrode potentials of the positive electrode and the negative electrode to move to a noble side or base side. Moreover, in the presence of oxygen etc., an oxidation reaction without charge transfer advances and the electrode potential moves to a noble side. If these phenomena continue, the electrode potential reaches to a potential at which the electrode material and the electrolyte material are oxidized or deoxidized and degradation of these materials proceeds, which poses a problem of shortening a life of the electric double layer capacitor.

SUMMARY OF THE INVENTION

The present invention is made in view of the above-mentioned conventional problems, and its object is to provide an electric double layer capacitor excellent in long-life performance by controlling the electrode potential of the positive electrode and/or the negative electrode.

In order to attain the above-mentioned object, this invention provides an electric double layer capacitor that includes a pair of electrode one of which is at least a polarizable electrode and an electrolyte, further including an auxiliary electrode that is connected serially to the positive electrode and controls a charge status of the positive electrode independently from the negative electrode.

An alternative one that is provided by the invention is an electric double layer capacitor including a pair of electrodes at least one of which is a polarizable electrode, a separator, and electrolyte, further including an auxiliary electrode for controlling a charge status of the negative electrode independently from the positive electrode.

In addition, the invention provides an energy storage system that uses any one of the above-mentioned electric double layer capacitors as a source of electricity.

In addition, the invention provides a secondary cell having a pair of positive and negative electrodes, further including an auxiliary electrode that is connected to the positive electrode serially through a resistor and controls a charge status of the positive electrode independently from the negative electrode.

DESCRIPTION OF THE PREFERRED EMBODIMENT(S)

Hereafter, the best mode to carry out this invention (hereinafter referred to as an embodiment) will be explained according to the drawings.

Figure 1:
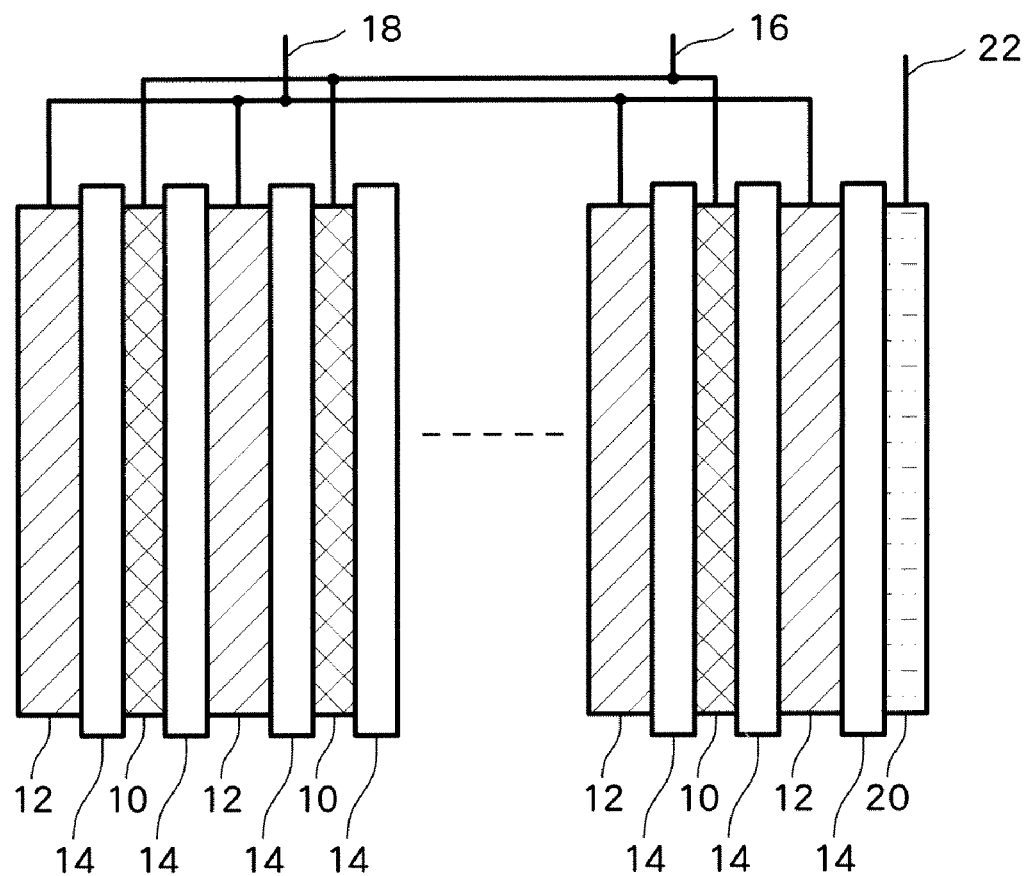
FIG. 1 a diagram showing a configuration example of an embodiment of an electric double layer capacitor according to this invention.

FIG. 1 shows one embodiment of the electric double layer capacitor according to this invention. In FIG. 1, a positive electrode 10 and a negative electrode 12 are alternately laminated with the medium of a separator 14 and these positive electrodes 10, negative electrodes 12, and separators 14 are impregnated with electrolyte. Moreover, lead wires 16 and 18 are connected to the positive electrode 10 and the negative electrode 12, respectively.

The above-mentioned positive electrode 10 and the negative electrode 12 are polarizable electrodes each prepared by mixing an activated carbon acting as an electrode active material, a conductive material such as carbon black, and a binder material of polyvinylidene fluoride etc. in a solvent of n-methylpyrrolidone etc. to obtain slurry, coating the slurry on a collector substrate made of aluminum, drying, and rolling it. Note that at least one of the positive electrode 10 and the negative electrode 12 needs to be the polarizable electrode. In this case, the other electrode may be either an electrode that oxidizes or deoxidizes the electrolyte, reversibly or irreversibly, or one that is oxidized or deoxidized, reversibly or irreversibly, as the operation of charging or discharging the electric double layer capacitor proceeds. For example, the positive electrode 10 is determined to be a polarizable electrode whose principal material is activated carbon and the negative electrode 12 is determined to be a platinum electrode, the positive electrode 10 supports discharge and charge by using desorption and adsorption of anion and the negative electrode 12 supports discharge and charge by deoxidization and oxidization of the electrolyte, and thus the two electrodes 10, 12 can function as a capacitor. In addition, as electrodes each of which oxidizes and deoxidizes the electrode itself, there are electrodes made of $MCoO_2$, $MNiO_2$, $MMn_2O_4$, $Ni(OH)_2$, $PbO$, and $SnO$ (M is a monovalent metal) etc., and all configurations of combining the polarizable electrode and one of these non-polarizable electrodes are possible. Moreover, the separator 14 is made up of a material of ion permeability, such as glass fiber.

What is characteristic in this embodiment is to have an auxiliary electrode 20 independently from the positive electrode 10 and the negative electrode 12. This auxiliary electrode 20 is serially connected with the positive electrode 10 and has a function of controlling a charge status of the positive electrode 10 independently from the negative electrode 12 and/or a function of controlling a charge status of the negative electrode 12 independently from the positive electrode 10 by conducting charge between itself and the negative electrode 12.

The above-mentioned auxiliary electrode 20 is not limited particularly as long as it is a polarizable electrode. In order to eliminate heterogeneous materials in the electric double layer capacitor as much as possible, it is suitable to use an auxiliary electrode prepared by mixing an activated carbon, a conductive material such as carbon black and a binder material such as polyvinylidene fluoride, in a solvent of n-methylpyrrolidone to prepare slurry, coating and drying the slurry on a collector substrate made of aluminum, and rolling it.

As shown in FIG. 1, the auxiliary electrode 20 is disposed to an electrode group consisting of the positive electrodes 10, the negative electrodes 12, and the separators 14 with another separator 14 interposed therebetween so as not to hinder movement of ions between the positive electrode 10 and the negative electrode 12 and so as to allow the ions to move between the positive electrode 10 and the auxiliary electrode 20 or between the negative electrode 12 and the auxiliary electrode 20. Moreover, lead wire 22 is connected also to the auxiliary electrode 20. However, arrangement of the auxiliary electrode 20 and its size are not limited to the example shown in FIG. 1.

Incidentally, in FIG. 1 above, illustrations of a case that houses the electrode group, the auxiliary electrode 20, etc. and the collector substrate are omitted.

Figure 2:
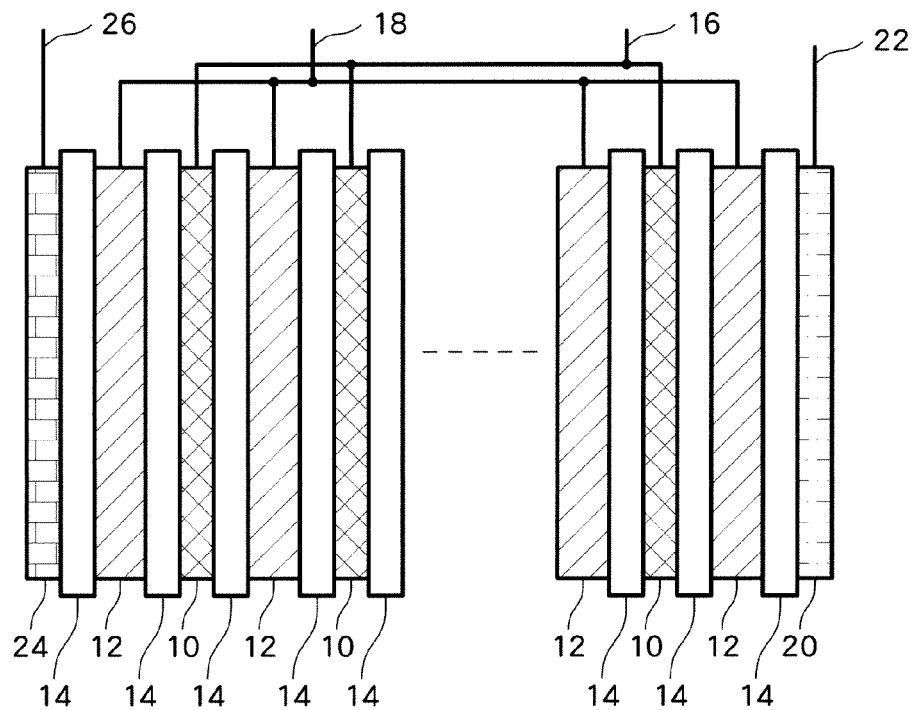
FIG. 2 is a diagram showing a configuration example of another embodiment of the electric double layer capacitor according to this invention.

FIG. 2 shows a configuration example of another embodiment of an electric double layer capacitor according to this invention and the same constituents as those in FIG. 1 are given the same reference numerals. In FIG. 2, what is characteristic is that a reference electrode 24 is further disposed to the electrode group consisting of the positive electrodes 10, the negative electrodes 12, and the separators 14 with another separator 14 interposed therebetween. This reference electrode 24 is used for measuring electric potentials of the positive electrode 10 and/or the negative electrode 12.

The above-mentioned reference electrode 24 is a polarizable electrode that has a stable equilibrium potential and is constructed with a material excellent in reproducibility. For example, as such a polarizable electrode, the standard hydrogen electrode is used in aqueous systems. More specifically, the standard hydrogen electrode is a platinum electrode with platinum-black that has a catalytic action to an electrode reaction of $H^+ + e^- = \frac{1}{2}H_2$ and whose surface is aerated hydrogen gas in a solution in which hydrogen ions exist, and the like. The equilibrium potential Eeq is given by Nernst's equation shown below.

$$E_{eq} = E° + (RT/F)\ln a_{H+} - (RT/2F)\ln(p_{H2}/p°)$$

where
 E°: Normal electrode potential of hydrogen electrode
 $a_{H+}$: Activity of hydrogen ion ($H^+$)
 $p_{H2}$: Partial pressure of hydrogen
 p°: Standard pressure Alternatively, for the reference electrode 24, a silver-silver halide electrode, mercury-mercury compound electrode, etc. can also be used besides it.

Materials of the reference electrode 24 described above are not limited particularly as long as a chemical reaction between two kinds of compounds or more is reversible and its equilibrium is stable. It is constructed by contacting, for example, a metal and an oxide of the metal so that an equilibrium potential is kept. In this invention, aluminum sheet containing aluminum oxide was made to contact with an aluminum lead to produce an equilibrium of aluminum and aluminum oxide and this combination was used as the reference electrode 24. Specifically, the reference electrode was prepared by welding an etched aluminum sheet 30CB from JAPAN CAPACITOR INDUSTRIAL CO., LTD. and an aluminum tape which was utilized as a terminal and a side material for equilibrium. However, any electrode other than this can be used as long as it can satisfy above reference electrode conditions. Hereinafter, the reference electrode 24 that is manufacture by welding etched aluminum sheet 30CB from JAPAN CAPACITOR INDUSTRIAL CO., LTD. described above and aluminum tape is referred to as an Al/AlOx electrode.

The above-mentioned Al/AlOx electrode maintains an equilibrium with 100-200 mV vs. SHE (standard hydrogen electrode) in propylene carbonate solution of a 1.0 mol/l tetraethylammonium tetrafluoroborate at a room temperature.

As shown in FIG. 2, the reference electrode 24 is disposed to the electrode group consisting of the positive electrodes 10, the negative electrodes 12, the auxiliary electrode 20, and the separators 14 with another separator 14 interposed therebetween so as not to inhibit movement of ions between the positive electrode 10 and the negative electrode 12, and so as to allow the ions to move between the positive electrode 10 and the reference electrode 24 or between the negative electrode 12 and the reference electrode 24. Moreover, lead wire 26 is connected also to the reference electrode 24. However, placement and dimensions of the reference electrode 24 are not limited to the example shown in FIG. 2.

Generally, when discharge and charge of the electric double layer capacitor are repeated, the electrode potential moves to a noble side gradually. When the positive electrode potential exceeds 2000 mV vs. Al/AlOx during charge, a side reaction different from ion adsorption will start on the positive electrode 10. Concurrently with it, the discharge capacity of the electric double layer capacitor decreases and the internal resistance increases.

Consequently, if only the positive electrode 10 or only the negative electrode 12 is deoxidized just when this side reaction starts or in a state before it starts, the potentials of the positive electrode 10 and the negative electrode 12 can be moved to the low electric potential side; therefore, the above-mentioned side reaction can be inhibited. In the electric double layer capacitor according to this embodiment, deoxidization of the positive electrode 10 or the negative electrode 12 is performed by the method described below.

1. A method of controlling a charge status of the positive electrode 10 by discharging the positive electrode 10 between the positive electrode 10 and the auxiliary electrode 20

Figure 3:
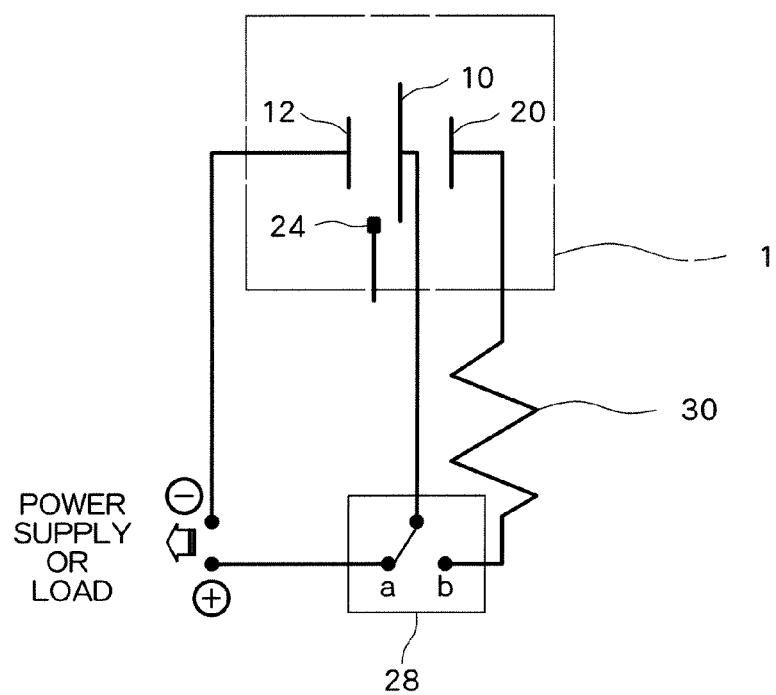
FIG. 3 is a diagram showing a configuration for controlling a charge status of a positive electrode by discharging the positive electrode between the positive electrode and the auxiliary electrode in the electric double layer capacitor of either FIG. 1 or FIG. 2.

FIG. 3 shows a configuration of controlling a charge status of the positive electrode 10 by discharging the positive electrode 10 between the positive electrode 10 and the auxiliary electrode 20. In the configuration shown in FIG. 3, a power supply for charging or an electric load for discharging is connected between a terminal which leads to the positive electrode 10 and a terminal which leads to the negative electrode 12 of an electric double layer capacitor 1 according to this embodiment and a changeover switch 28 is interposed between the power supply or load and the positive electrode 10. In this case, the power supply or load is connected to a terminal a of the changeover switch 28. Moreover, the auxiliary electrode 20 is connected to a terminal b of this changeover witch 28 through a resistor 30, and a connection destination of the positive electrode 10 is switched to either the power supply (or load) or the auxiliary electrode 20 by the changeover switch 28.

In the configuration shown in FIG. 3, when the electric double layer capacitor is charged or discharged between the positive electrode 10 and the negative electrode 12, the changeover switch 28 is switched to the terminal 'a' and the terminal which leads to the positive electrode 10 is connected to the power source or load. Moreover, when the positive electrode 10 is discharged to control the charge status, the changeover switch 28 is switched to the terminal 'b' from the terminal 'a'.

Figure 4:
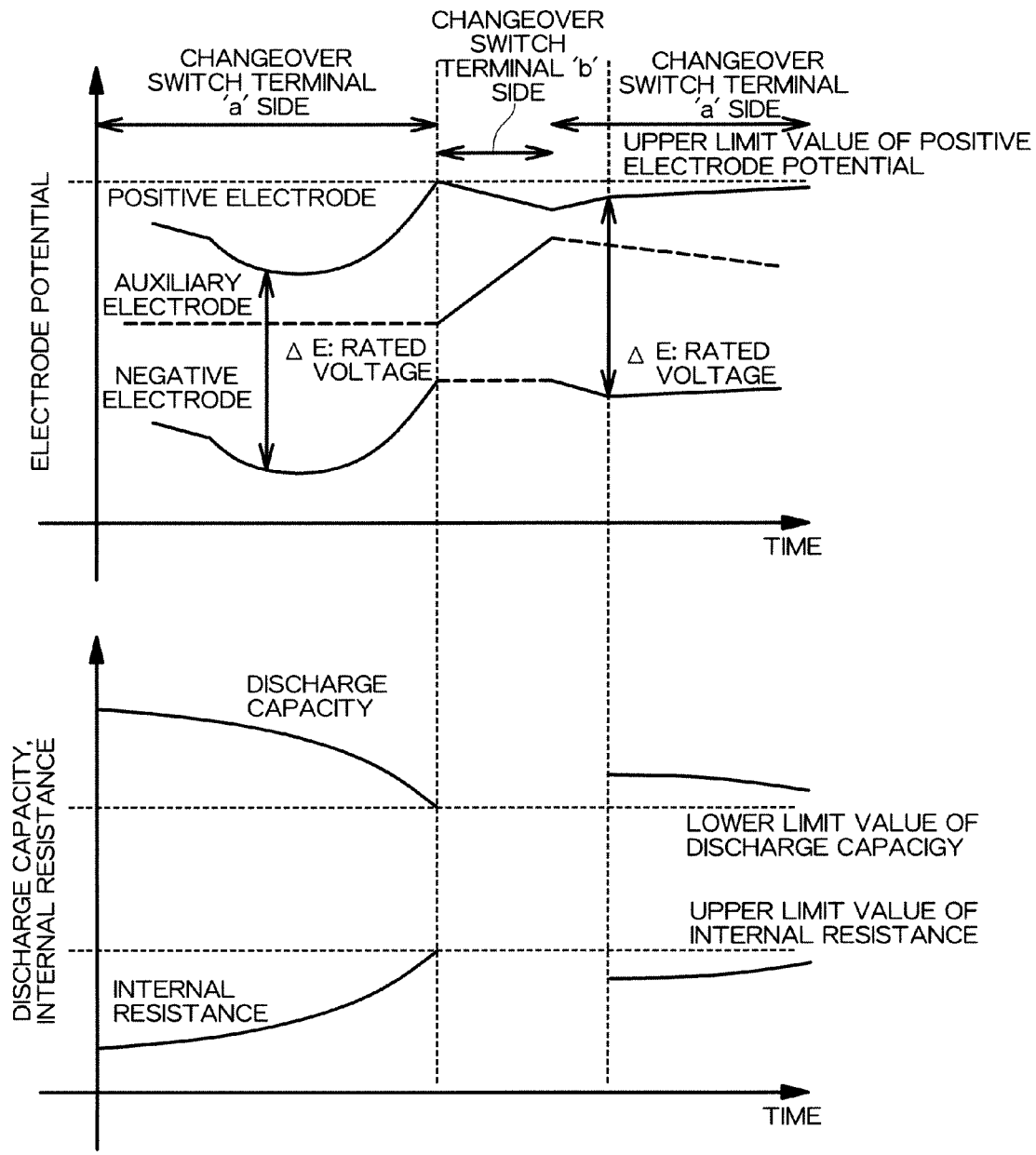
FIG. 4 is a diagram showing changes of electrode potentials of the positive electrode and the negative electrode, discharge capacity, and internal resistance when the electric double layer capacitor is put into operation by the circuit of FIG. 3.

FIG. 4 shows changes of the electrode potentials of the positive electrode 10 and the negative electrode 12, the discharge capacity, and the internal resistances in the case where the above-mentioned changeover switch 28 is switched to put the electric double layer capacitor 1 into operation.

As shown in FIG. 4, if the changeover switch 28 is connected to the terminal a and the charge and discharge of the electric double layer capacitor 1 are repeated, the electrode potentials will rise as the time elapses while maintaining a rated voltage $\Delta E$ between the positive electrode 10 and the negative electrode 12. Here, as described previously, if the positive electrode potential exceeds 2000 mV vs. Al/AlOx, the discharge capacity of the electric double layer capacitor 1 will decrease and the internal resistance will increase. Therefore, the discharge capacity or internal resistance of the electric double layer capacitor is monitored, and when the discharge capacity of the electric double layer capacitor becomes equal to or lower than a predetermined threshold (lower limit value) or the internal resistance becomes equal to or more than a predetermined threshold (upper limit value), the changeover switch 28 will be switched to the terminal 'b' to make a circuit between the positive electrode 10 and the negative electrode 12 be an open circuit, whereby discharge and charge of the electric double layer capacitor 1 will be halted. Moreover, at the same time, the resistor 30 of $10^2/x - 10^5/x$ $\Omega$ (x: electrostatic capacity of the electric double layer capacitor 1) is interposed between the positive electrode 10 and the auxiliary electrode 20 to establish a closed circuit, whereby the positive electrode 10 will be discharged through the resistor 30. By this discharging, the positive electrode electric potential is lowered, as shown in FIG. 4.

In addition, the internal resistance of the above-mentioned electric double layer capacitor can be monitored by the following steps: the electric double layer capacitor is disconnected from the operation circuit, an internal impedance between the two electrodes is measured with an alternating current impedance meter at 1000 Hz, and the internal impedance is assumed as the internal resistance. Alternatively, the internal resistance may be monitored by connecting the two electrodes to an external predetermined load resistor and finding a voltage drop in the case of temporal discharge of a few msec to a few sec. Further Alternatively, if the electric double layer capacitor cannot be disconnected from the operation circuit, the internal resistance can be monitored by measuring a voltage drop when the circuit is let to discharge the capacitor.

The discharge capacity of the above-mentioned electric double layer capacitor can also be monitored, similarly as in the case of the internal resistance, by the following steps: the electric double layer capacitor is connected to an external predetermined load resistor, a discharging operation is conducted through the load resistor or using the operation circuit, and a discharge current and a voltage drop between the two electrodes are measured.

Next, when resistance discharge under arbitrary conditions is finished, the changeover switch 28 is switched back to the terminal 'a' from the terminal 'b' to make a circuit between the positive electrode 10 and the auxiliary electrode 20 be an open circuit and establish a closed circuit between the positive electrode 10 and the negative electrode 12 be a closed circuit, and charge is conducted. Then, as shown in FIG. 4, a voltage between the positive electrode 10 and the negative electrode 12 becomes the rated voltage $\Delta E$ and the electrode potential of the positive electrode 10 becomes lower than at the time of halt of discharge and charge described above. This can inhibit the side reaction described above.

The threshold of above-mentioned discharge capacity or internal resistance can be set up arbitrarily. However, considering its commodity value (the degree of a balance attained between a maintenance ratio of the discharge capacity that is chronologically stable and the discharge capacity), it is desirable that the threshold of the discharge capacity is 50% or more of the initial discharge capacity and the threshold of the internal resistance is 200% or less of the initial internal resistance. This is because this type of capacitor is likely to lack a capability of being operable as the electric double layer capacitor outside a range of these values. In addition, as the threshold of the discharge capacity approaches 100% of the initial discharge capacity, the number of controls will increase, and it becomes not realistic. However, in order to attain a longer life of the electric double layer capacitor, it is desirable that the threshold is set to 80% or more of the initial discharge capacity, further desirable 90% or more, and most desirable 100% or more. Moreover, similarly as above, as the threshold of the initial resistance approaches 100% of the initial internal resistance, the number of controls will increase, and it becomes not realistic. However, in order to attain a longer life of the electric double layer capacitor, it is desirable that the threshold is set to 150% or less of the initial internal resistance, further desirable 110% or less, and most desirable 100%.

Moreover, as shown in FIG. 3, in the case where the electric double layer capacitor is equipped with the reference electrode 24, the electrode potential of the positive electrode 10 may be monitored with reference to the reference electrode 24. When the electrode potential of the positive electrode 10 reaches a predetermined threshold (upper limit value), the changeover switch 28 is switched to the terminal 'b' from the terminal a to make a circuit between the positive electrode 10 and the negative electrode 12 be an open circuit, and resistance discharge is conducted between the positive electrode 10 and the auxiliary electrode 20. After finishing resistance discharge on arbitrary conditions, the changeover switch 28 is switched back to the terminal a from the terminal b to make a circuit between the positive electrode 10 and the auxiliary electrode 20 be an open circuit, and establish a closed circuit between the positive electrode 10 and the negative electrode 12.

The above-mentioned threshold of the electrode potential can be set up arbitrarily. However, for example, in the case where an Al/AlOx electrode is used for the reference electrode 24 and an activated carbon Al composite electrode that is an aluminum substrate deposited on or coated with activated carbon is used as the positive electrode 10, this electrode has an oxidation wave in the vicinity of about 2000 mV vs. Al/AlOx to about 2500 mV vs. Al/AlOx at a room temperature or at 60° C.; therefore, it is desirable that the threshold of the electrode potential of the positive electrode 10 is about 2500 mV vs. Al/AlOx or less. Note that, as this electrode potential becomes lower potential side, the number of controls will increase, ant it becomes not realistic. However, in order to attain a longer life of the electric double layer capacitor, it is more desirable that the threshold of the electrode potential is set to 1800 mV vs. Al/AlOx or less, and further desirable that it is set to an even base side.

Even in the case where an electrode having an arbitrary potential E* other than the above-mentioned Al/AlOx electrode is used as the reference electrode 24 and an activated carbon Al complex electrode that is an aluminum substrate deposited on or coated with activated carbon is used as the positive electrode 10, a threshold of the electrode potential of the positive electrode 10 can be set up arbitrarily. When the equilibrium potential of the electrode that has an arbitrary potential $E^*$ is $E^*_R$, it is desirable that the threshold is $2300-E^*_R$ mV or less to the reference electrode 24. Note that, as in the case of the above-mentioned Al/AlOx electrode, as this electrode potential of an arbitrary electrode moves to the lower potential side, the number of controls will increase and it becomes not realistic. However, in order to attain a longer life of the electric double layer capacitor, it is more desirable that a threshold of the electrode potential is set to $1600-E^*_R$ mV or less to the reference electrode 24, and it is even more desirable that the potential is set to a lower potential.

2. A method of controlling a charge status of the negative electrode 12 by conducting charge between the negative electrode 12 and the auxiliary electrode 20

Figure 5:
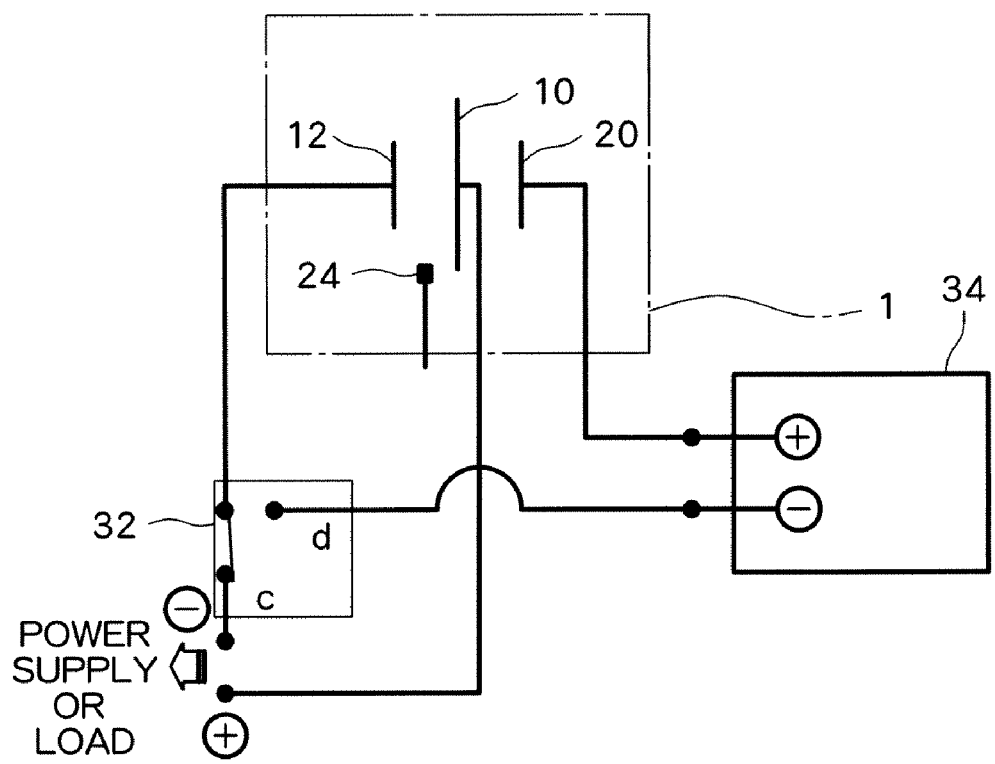
FIG. 5 is a diagram showing a configuration of controlling a charge status of the negative electrode by charging the negative electrode between the negative electrode and the auxiliary electrode in the electric double layer capacitor of either FIG. 1 or FIG. 2.

FIG. 5 shows a configuration of controlling a charge status of the negative electrode 12 by conducting charge between the negative electrode 12 and the auxiliary electrode 20, and the same constituents as those of FIG. 3 are given the same reference numerals. In FIG. 5, the changeover switch 32 is connected to the negative-electrode 12 of the electric double layer capacitor 1, a terminal c of the changeover switch 32 is connected to the power supply or load, and a terminal d is connected to the negative electrode terminal of the regulated power supply 34. Moreover, the positive electrode terminal of the regulated power supply 34 is connected to the auxiliary electrode 20 of the electric double layer capacitor 1.

In the configuration shown in FIG. 5, when charging or discharging the electric double layer capacitor 1 between the positive electrode 10 and the negative electrode 12, the changeover switch 32 is switched to the terminal c, and the negative electrode 12 is connected to the power supply or load. Moreover, when the negative electrode 12 is charged to control a charge status, the changeover switch 32 is switched to the terminal d from the terminal 'c'.

Figure 6:
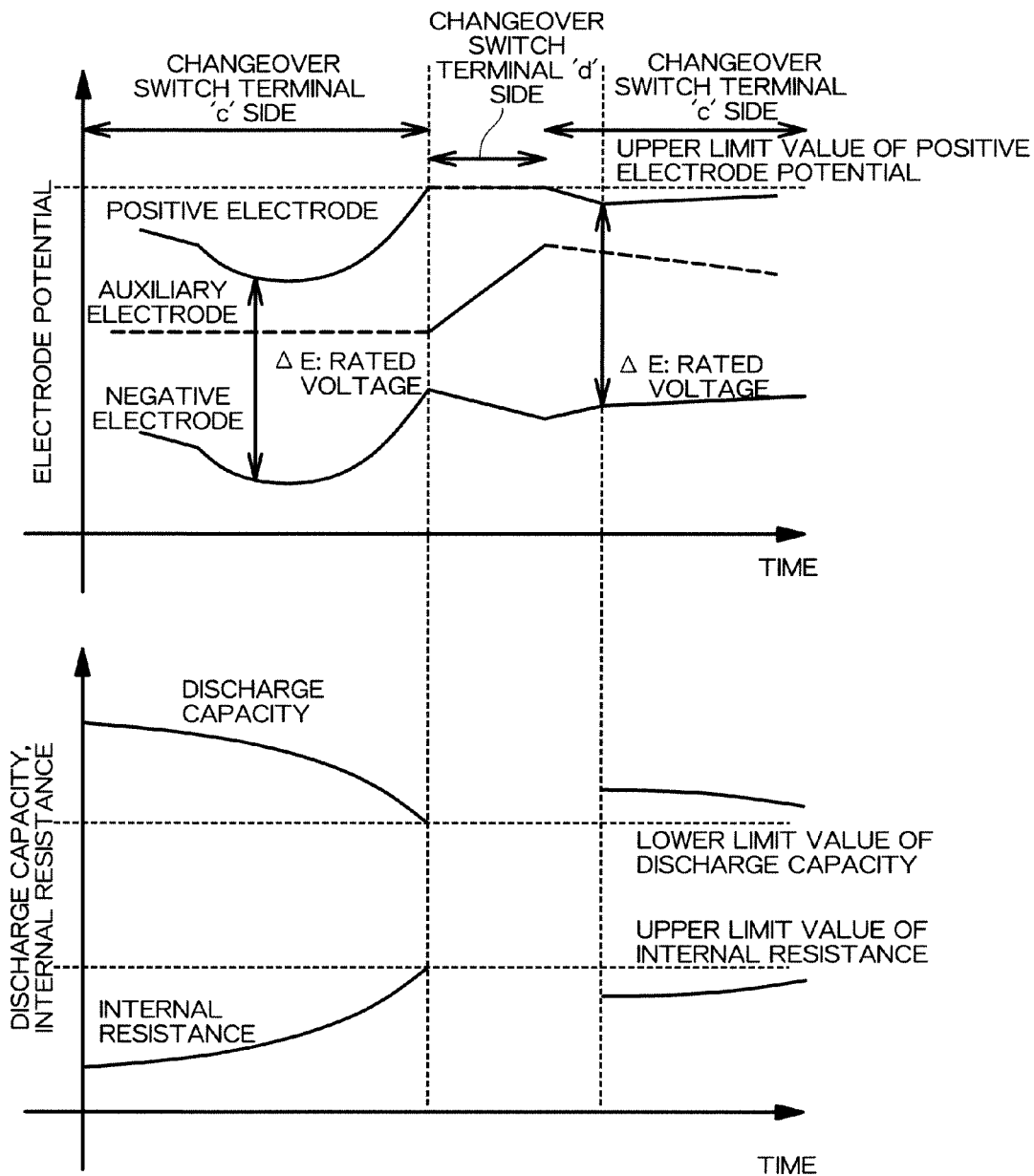
FIG. 6 is a diagram showing the changes of electrode potentials of the positive electrode and the negative electrode, the discharge capacity, and the internal resistance when the electric double layer capacitor is put into operation by the circuit of FIG. 5.

FIG. 6 shows changes of the electrode potentials of the positive electrode 10 and the negative electrode 12, the discharge capacity, and the internal resistances when the above-mentioned changeover switch 32 is switched to put the electric double layer capacitor 1 into operation.

As shown in FIG. 6, when discharge and charge of the electric double layer capacitor 1 are repeated with the changeover switch 32 being switched to the terminal 'c', the electrode potential will rise with a lapse of the time while maintaining the rated voltage ΔE between the positive electrode 10 and the negative electrode 12. Here, as described above, when the positive electrode electric potential exceeds 2000 mV vs. Al/AlOx, the discharge capacity of the electric double layer capacitor 1 will decrease, and the internal resistance will increase. Then, the discharge capacity or internal resistance of the electric double layer capacitor 1 is monitored, and when the discharge capacity becomes equal to or less than a predetermined threshold (lower limit value) or when the internal resistance becomes equal to or more than a predetermined threshold (upper limit value), the changeover switch 32 is switched to the terminal d from the terminal c to make a circuit between the positive electrode 10 and the negative electrode 12 be an open circuit, and charge/discharge of the electric double layer capacitor 1 is halted. Moreover, the negative electrode 12 is simultaneously connected to the negative electrode terminal side of the regulated power supply 34. With this connection, the charge is conducted between the negative electrode 12 and the auxiliary electrode 20, and the electric potential of the negative electrode 12 is lowered.

Next, after finishing the charge between the auxiliary electrode 20 and the negative electrode 12, the changeover switch 32 is switched back to the terminal 'c' from the terminal 'd' to make a circuit between the auxiliary electrode 20 and the negative electrode 12 be an open circuit and establish a closed circuit between the positive electrode 10 and the negative electrode 12, and the electric double layer capacitor 1 is charged from the power supply. By this charge, a voltage between the positive electrode 10 and the negative electrode 12 becomes the rated voltage ΔE and the electrode potential of the positive electrode 10 becomes lower than at the time of halt of the above-mentioned discharge and charge; therefore, the side reaction described above can be inhibited.

Incidentally, a threshold of the above-mentioned discharge capacity or internal resistance can be determined in the same way as was described in FIGS. 3 and 4. Alternatively, as shown in FIG. 5, in the case where the electric double layer capacitor 1 is equipped with the reference electrode 24, the above-mentioned operation of charging the negative electrode 12 between the negative electrode 12 and the auxiliary electrode 20 may be conducted when the electrode potential of the positive electrode 10 is monitored with respect to the reference electrode 24 and the electrode potential of the positive electrode 10 has reached a predetermined threshold (upper limit value). The thresholds in this case are the same as those described in FIGS. 3 and 4.

Note that in the embodiment above, the example where this invention was applied to the electric double layer capacitor was illustrated, but this invention is not limited to the electric double layer capacitor, being applicable to other secondary cells.

Embodiment

Hereafter, a concrete example of this invention will be explained as an embodiment.

Activated carbon used as an electrode active material was manufactured in the following process. SHOWNOL BRP-510F from SHOWA HIGHPOLYMER CO., LTD. was cured at 180° C. to be made non-soluble, subsequently subjected to coarse grinding and carbonization/calcination, and further subjected to water-vapor activation and fine grinding to yield activated carbon. This activated carbon was named as the active material A. The active material A, Denkablack HS-100 from DENKI KAGAKU KOGYO K.K., and PVdF (polyvinylidene fluoride) from SIGMA-ALDRICH JAPAN K.K. are mixed to a mass compounding ratio of 100.0: 5.0: 5.5, to which 250 parts by mass of 1-methyl-2-pyrrolidone (NMP) from GODO Solvents Co. was added to prepare electrode slurry.

This electrode slurry is coated on one surface of aluminum oxide sheet 30CB (t=0.030 mm) from JAPAN CAPACITOR INDUSTRIAL CO. LTD., dried, and rolled. The aluminum oxide sheet is cut out to a member of 50.0 mm (coated section of 40.0 mm in it)×20.0 mm and aluminum tape of t=3.0 mm is welded to its uncoated section to obtain the electrode.

Among pieces of this electrode, electrodes of mass=0.115 g and thickness=0.13 mm (a packing density of 0.55 g/cc and a space volume of 45 mcc) were selected to be positive electrodes, and electrodes of mass=0.125 g and thickness=0.16 mm (a packing density of 0.52 g/cc and a space volume of 65 mcc) were selected to be negative electrodes.

Further, electrodes of mass=0.115 g and thickness=0.13 mm (a packing density of 0.55 g/cc and a space volume of 45 mcc) were selected for the auxiliary electrodes and used.

For the reference electrode, an electrode that was prepared by cutting out oxidized aluminum sheet 30CB (t=0.030 mm) from JAPAN CAPACITOR INDUSTRIAL CO., LTD. into 50.0 mm×20.0 mm, overlaying aluminum tape of a width of 3.0 mm and a length of 50.0 mm that was cut out to a length of 20.0 mm on the cut-out 30CB, and welding them together was used.

The two positive electrodes and two negative electrodes thus manufactured were used to construct an electrode group by opposing the deposited surface of the positive electrode to the deposited surface of the negative electrode face with a separator NI040A from Nippon Sheet Glass Co., Ltd. interposed therebetween, In addition, the auxiliary electrode and the reference electrode were also arranged with the above-mentioned separator NI040A interposed therebetween to achieve a lamination of auxiliary electrode-separator-negative electrode-separator-positive electrode-separator-positive electrode-separator-negative electrode-separator-reference electrode in a cross-sectional direction to prepare the electrode group.

This electrode group was inserted into an aluminum laminate container, subsequently propylene carbonate solution of 1.0 mol/l tetraethylammonium tetrafluoroborate from TOMIYAMA PURE CHEMICAL INDUSTRIES, LTD. was poured into thew container as an electrolyte excessively by 10 vol. % or more to the total space volume of the electrode group and placed in pressure reduction at 10 Torr (1330 Pa) or less for 1-hour. The surplus solution was dumped, and the container was fused and welded to provide an electric double layer capacitor cell.

In an ambient of 25±5° C., this electric double layer capacitor cell was charged for 10 hours at a constant voltage of 3.2 V that was a setup voltage between the positive electrode and the negative electrode and, after 1-hour rest, discharged at a current value of 10.0 mA to a voltage of 1.0 V.

Further, the electric double layer capacitor cell was charged for 1.5 hours at a constant current of a current value of 10.0 mA and at a constant voltage of 3.0 V that was a setup voltage and, after 1-hour rest, discharged at a current value of 10.0 mA to a voltage of 1.0 V, which cycle of charge/discharge was repeated for three cycles. After charge or discharge, internal impedance between the positive electrode and the negative electrode at 1000 Hz was measured with an alternating current impedance meter (a product from HOKUTO DENKO CORPORATION; electrochemical measurement system HZ-3000) as a substitute for internal resistance.

Designating the third discharge energy as $E_0$ and a static capacitance of this electric double layer capacitor as $C_0$, respectively, $C_0$ that satisfies $E_0=\frac{1}{2} \cdot C_0 \cdot (V_2^2 - V_1^2)$ was found and assigned as initial electrostatic capacity.

Incidentally, voltages $V_1$, $V_2$ that are not accompanied with description of explanation represent voltages between the positive electrode and the negative electrode, and in this case $V_1$=3.0 V and $V_2$=1.0 V.

As life performance evaluation of the electric double layer capacitor described above, the following life test was conducted.

COMPARATIVE EXAMPLE

After finishing the above-mentioned charge/discharge, constant-voltage charge was conducted continuously at a rated voltage of 3.0 V at 70° C. After conducting the constant-voltage charge for a certain arbitrary time, the charge was halted and, after 1-hour rest, discharge was conducted at a current value of 10.0 mA to a voltage of 1.0 V. This operation was repeated and the maintenance ratio of the discharge capacity when a total time of the constant-voltage charging time reached 500 hours, that is, a ratio of the discharge capacity after 500 hours elapsed to an initial discharge capacity was obtained. Moreover, after the charge or discharge, an internal impedance at 1000 Hz between the positive electrode and the negative electrodes was measured, which was assumed as a substitute for an internal resistance.

Example 1

In an electric double layer capacitor having the positive electrodes 10, the negative electrodes 12, and the auxiliary electrode 20 shown in FIG. 1, the same life test as in the comparative example was conducted. In this occasion, the discharge capacity was measured every 50 hours of charging time, and when the discharge capacity decreased to 50% of its initial value, the changeover switch 28 was switched to the terminal 'b' in a circuit shown in FIG. 3 and discharge between the positive electrode 10 and the auxiliary electrode 20 was conducted for 1 hour. After that, the changeover switch 28 was switched to the terminal a, and the life test was continued.

Example 2

In an electric double layer capacitor having the positive electrodes 10, the negative electrodes 12, and the auxiliary electrode 20 shown in FIG. 1, the same life test as in the comparative example was conducted. In this occasion, the discharge capacity was measured every 50 hours of charging time, and when the discharge capacity decreased to 80% of its initial value, the changeover switch 28 was switched to the terminal 'b' in the circuit shown in FIG. 3 and discharge between the positive electrode 10 and the auxiliary electrode 20 was conducted for 1 hour. After that, the changeover switch 28 was switched to the terminal 'a' and the life test was continued.

Example 3

In an electric double layer capacitor having the positive electrodes 10, the negative electrodes 12, and the auxiliary electrode 20 shown in FIG. 1, the same life test as in the comparative example was conducted. In this occasion, the discharge capacity was measured every 50 hours of charging time, and when the discharge capacity decreased to 90% of its initial value, the changeover switch 28 was switched to the terminal 'b' in the circuit shown in FIG. 3 and discharge between the positive electrode 10 and the auxiliary electrode 20 was conducted for 1 hour. After that, the changeover switch 28 was switched to the terminal 'a', and the life test was continued.

Example 4

In the electric double layer capacitor having the positive electrodes 10, the negative electrodes 12, and the auxiliary electrode 20 shown in FIG. 1, the same life test as in the comparative example was conducted. In this occasion, the internal impedance at 1000 Hz was measured every 50 hours of charging time, and when the internal impedance increased to 200% of its initial value, the changeover switch 28 was switched to the terminal 'b' in the circuit shown in FIG. 3 and resistance discharge between the positive electrode 10 and the auxiliary electrode 20 was conducted for 1 hour. After that, the changeover switch 28 was switched to the terminal 'a', and the life test was continued.

Example 5

In the electric double layer capacitor having the positive electrodes 10, the negative electrodes 12, and the auxiliary electrode 20 shown in FIG. 1, the same life test as in the comparative example was conducted. In this occasion, the internal impedance at 1000 Hz was measured every 50 hours of charging time, and when the internal impedance increased to 150% of its initial value, the changeover switch 28 was switched to the terminal 'b' in the circuit shown in FIG. 3 and resistance discharge between the positive electrode 10 and the auxiliary electrode 20 was conducted for 1 hour. After that, the changeover switch 28 was switched to the terminal 'a', and the life test was continued.

Example 6

In the electric double layer capacitor having the positive electrodes 10, the negative electrodes 12, and the auxiliary electrode 20 shown in FIG. 1, the same life test as in the comparative example was conducted. In this occasion, the discharge capacity was measured every 50 hours of charging time, and when the discharge capacity decreased to 50% of its initial value, the changeover switch 32 was switched to the terminal 'd' in a circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued.

Example 7

In the electric double layer capacitor having the positive electrodes 10, the negative electrodes 12, and the auxiliary electrode 20 shown in FIG. 1, the same life test as in the comparative example was conducted. In this occasion, the discharge capacity was measured every 50 hours of charging time, and when the discharge capacity decreased to 80% of its initial value, the changeover switch 32 was switched to the terminal 'd' in the circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued.

Example 8

In the electric double layer capacitor having the positive electrodes 10, the negative electrodes 12, and the auxiliary electrode 20 shown in FIG. 1, the same life test as in the comparative example was conducted. In this occasion, the internal impedance at 1000 Hz was measured every 50 hours of charging time, and when the internal impedance increased to 200% of its initial value, the changeover switch 32 was switched to the terminal d in the circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued.

Example 9

In the electric double layer capacitor having the positive electrode 10, the negative electrode 12, and the auxiliary electrode 20 shown in FIG. 1, the same life test as in the comparative example was conducted. In this occasion, the internal impedance at 1000 Hz was measured every 50 hours of charging time, and when the internal impedance increased to 150% of its initial value, the changeover switch 32 was switched to the terminal 'd' in the circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued.

Example 10

In the electric double layer capacitor having the positive electrodes 10, the negative electrodes 12, the auxiliary electrode 20, and the reference electrode 24 shown in FIG. 2, the same life test as in the comparative example was conducted. In this occasion, the electrode potentials of the positive electrode 10 and the reference electrode 24 were measured, and when the electrode potential of the positive electrode 10 reached 2500 mV, the changeover switch 28 was switched to the terminal 'b' in the circuit shown in FIG. 3 and resistance discharge between the positive electrode 10 and the auxiliary electrode 20 was conducted for 1 hour. After that, the changeover switch 28 was switched to the terminal a, and the life test was continued. Moreover, the discharge capacity of the electric double layer capacitor (charge capacity) was measured every 50 hours.

Example 11

In the electric double layer capacitor having the positive electrodes 10, the negative electrodes 12, the auxiliary electrode 20, and the reference electrode 24 shown in FIG. 2, the same life test as in the comparative example was conducted. In this occasion, the electrode potentials of the positive electrode 10 and the reference electrode 24 were measured, and when the electrode potential of the positive electrode 10 reached 2000 mV, the changeover switch 28 was switched to the terminal 'b' in the circuit shown in FIG. 3 and resistance discharge between the positive electrode 10 and the auxiliary electrode 20 was conducted for 1 hour. After that, the changeover switch 28 was switched to the terminal 'a', and the life test was continued. Moreover, the discharge capacity of the electric double layer capacitor (charge capacity) was measured every 50 hours.

Example 12

In the electric double layer capacitor having the positive electrodes 10, the negative electrodes 12, the auxiliary electrode 20, and the reference electrode 24 shown in FIG. 2, the same life test as in the comparative example was conducted. In this occasion, the electrode potentials of the positive electrode 10 and the reference electrode 24 were measured, and when the electrode potential of the positive electrode 10 reached 1800 mV, the changeover switch 28 was switched to the terminal 'b' in the circuit shown in FIG. 3 and resistance discharge between the positive electrode 10 and the auxiliary electrode 20 was conducted for 1 hour. After that, the changeover switch 28 was switched to the terminal 'a', and the life test was continued. Moreover, the discharge capacity of the electric double layer capacitor (charge capacity) was measured every 50 hours.

Example 13

In the electric double layer capacitor having the positive electrodes 10, the negative electrodes 12, the auxiliary electrode 20, and the reference electrode 24 shown in FIG. 2, the same life test as in the comparative example was conducted. In this occasion, the electrode potentials of the positive electrode 10 and the reference electrode 24 were measured, and when the electrode potential of the positive electrode 10 reached 2500 mV, the changeover switch 32 was switched to the terminal 'd' in the circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued. Moreover, the discharge capacity of the electric double layer capacitor (charge capacity) was measured every 50 hours.

Example 14

In the electric double layer capacitor having the positive electrodes 10, the negative electrodes 12, the auxiliary electrode 20, and the reference electrode 24 shown in FIG. 2, the same life test as in the comparative example was conducted. In this occasion, the electrode potentials of the positive electrode 10 and the reference electrode 24 were measured, and when the electrode potential of the positive electrode 10 reached 2000 mV, the changeover switch 32 was switched to the terminal 'd' in the circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued. Moreover, the discharge capacity of the electric double layer capacitor (charge capacity) was measured every 50 hours.

Example 15

In the electric double layer capacitor having the positive electrodes 10, the negative electrodes 12, the auxiliary electrode 20, and the reference electrode 24 shown in FIG. 2, the same life test as in the comparative example was conducted. In this occasion, the electrode potentials of the positive electrode 10 and the reference electrode 24 were measured, and when the electrode potential of the positive electrode 10 reached 1800 mV, the changeover switch 32 was switched to the terminal 'd' in the circuit shown in FIG. 5 and constant-voltage charge between the auxiliary electrode 20 and the negative electrode 12 was conducted for 1 hour so that a voltage between the electrodes increased by 500 mV. After that, the changeover switch 32 was switched to the terminal 'c', and the life test was continued. Moreover, the discharge capacity of the electric double layer capacitor (charge capacity) was measured every 50 hours.

Table 1 shows results of the examples and the comparative example described above.

TABLE 1

| | Electrode configuration | Control electrodes | Control conditions | Discharge magnitude maintenance ratio/% |
|---|---|---|---|---|
| Comparative example | Positive electrode, negative electrode, auxiliary electrode, reference electrode | | | 75.0 |
| Example 1 | Positive electrode, negative electrode, auxiliary electrode | Positive electrode - auxiliary electrode | Discharge magnitude 50% lower limit | 75.0 |
| Example 2 | Positive electrode, negative electrode, auxiliary electrode | Positive electrode - auxiliary electrode | Discharge magnitude 80% lower limit | 81.0 |
| Example 3 | Positive electrode, negative electrode, auxiliary electrode | Positive electrode - auxiliary electrode | | 90.2 |
| Example 4 | Positive electrode, negative electrode, auxiliary electrode | Positive electrode - auxiliary electrode | Internal resistance 200% upper limit | 78.4 |
| Example 5 | Positive electrode, negative electrode, auxiliary electrode | Positive electrode - auxiliary electrode | Internal resistance 150% upper limit | 81.1 |
| Example 6 | Positive electrode, negative electrode, auxiliary electrode | Auxiliary electrode - negative electrode | Discharge magnitude 50% lower limit | 75.0 |
| Example 7 | Positive electrode, negative electrode, auxiliary electrode | Auxiliary electrode - negative electrode | Discharge magnitude 80% lower limit | 85.0 |
| Example 8 | Positive electrode, negative electrode, auxiliary electrode | Auxiliary electrode - negative electrode | Internal resistance 200% upper limit | 80.7 |
| Example 9 | Positive electrode, negative electrode, auxiliary electrode | Auxiliary electrode - negative electrode | Internal resistance 150% upper limit | 83.2 |

TABLE 1-continued

| | Electrode configuration | Control electrodes | Control conditions | Discharge magnitude maintenance ratio/% |
|---|---|---|---|---|
| Example 10 | Positive electrode, negative electrode, auxiliary electrode, reference electrode | Positive electrode - auxiliary electrode | Positive electrode potential 2500 mV upper limit | 90.1 |
| Example 11 | Positive electrode, negative electrode, auxiliary electrode, reference electrode | Positive electrode - auxiliary electrode | Positive electrode potential 2000 mV upper limit | 90.7 |
| Example 12 | Positive electrode, negative electrode, auxiliary electrode, reference electrode | Positive electrode - auxiliary electrode | Positive electrode potential 1800 mV upper limit | 91.3 |
| Example 13 | Positive electrode, negative electrode, auxiliary electrode, reference electrode | Auxiliary electrode - negative electrode | Positive electrode potential 2500 mV upper limit | 91.0 |
| Example 14 | Positive electrode, negative electrode, auxiliary electrode, reference electrode | Auxiliary electrode - negative electrode | Positive electrode potential 2000 mV upper limit | 93.0 |
| Example 15 | Positive electrode, negative electrode, auxiliary electrode, reference electrode | Auxiliary electrode - negative electrode | Positive electrode potential 1800 mV upper limit | 95.8 |

As shown in Table 1, when the constant-voltage charge was conducted continuously at a rated voltage of 3.0 V at 70° C., the maintenance ratio of the discharge capacity when a total time of constant-voltage charging time elapsed 500 hours is equal to or more than the value of the comparative example in any of the examples. The results in Table 1 demonstrate plainly that this invention can attain a longer life of the electric double layer capacitor.

What is claimed is:

1. An electric double layer capacitor, comprising:
   a pair of electrodes;
   a separator;
   an electrolyte; and
   an auxiliary electrode;
   wherein:
   at least one of the pair of electrodes is a polarizable electrode;
   the auxiliary electrode control a charge status of the positive electrode independently from the negative electrode.

2. The electric double layer capacitor according to claim 1, wherein
   the auxiliary electrode is a polarizable electrode.

3. The electric double layer capacitor according to claim 1, further comprising
   a reference electrode for measuring an electric potential of the positive electrode.

4. The electric double layer capacitor according to claim 3, wherein
   the reference electrode is a polarizable electrode.

5. The electric double layer capacitor according to claim 3, wherein
   the reference electrode is an electrode that maintains an equilibrium potential by contacting a metal and an oxide of the metal.

6. The electric double layer capacitor according to claim 5, wherein
   the reference electrode comprises aluminum.

7. An energy storage system, comprising the electric double layer capacitor according to claim 1, wherein the electric double layer capacitor functions as a power supply in the energy storage system.

8. An electric double layer capacitor, comprising:
   a pair of electrodes;
   a separator;
   an electrolyte; and
   an auxiliary electrode;
   wherein:
   at least one of the pair of electrodes is a polarizable electrode; and
   the auxiliary electrode controls a charge status of the negative electrode independently from the positive electrode; and
   the auxiliary electrode controls a charge status of the negative electrode by conducting charge between the auxiliary electrode and the negative electrode.

9. The electric double layer capacitor according to claim 8, wherein
   the auxiliary electrode is a polarizable electrode.

10. The electric double layer capacitor according to claim 8, further comprising
    a reference electrode for measuring an electric potential of the positive electrode.

11. The electric double layer capacitor according to claim 10, wherein
    the reference electrode is a polarizable electrode.

12. The electric double layer capacitor according to claim 10, wherein
    the reference electrode is a reference electrode that maintains an equilibrium potential by contacting a metal and an oxide of the metal.

13. The electric double layer capacitor according to claim 12, wherein
    the reference electrode comprises aluminum.

14. A secondary cell, comprising:
    a pair of positive and negative electrodes; and
    an auxiliary electrode;
    wherein:
    the auxiliary electrode is connected to the positive electrode through a resistor; and
    the auxiliary electrode controls a charge status of the positive electrode independently from the negative electrode.

* * * * *